United States Patent Office 3,312,678
Patented Apr. 4, 1967

3,312,678
POLYMERIZATION PROCESS UTILIZING PEROXY-
DICARBONATE ESTER AND AMINOAROMATIC
CARBOXYLIC ACID SALT AS CATALYST
John C. Crano, Barberton, Ohio, assignor to Pittsburgh
Plate Glass Company, Pittsburgh, Pa., a corporation of
Pennsylvania
No Drawing. Filed Feb. 1, 1963, Ser. No. 255,648
19 Claims. (Cl. 260—93.5)

This invention generally relates to the polymerization of olefinically unsaturated polymerizable compounds, notably compounds susceptible to free radical polymerization derived from ethylenes which contain the group:

In particular it relates to new redox-catalyst system and novel methods useful for producing low-temperature polymerization of such compounds. These systems are devised from organic peroxydicarbonate polymerization catalysts and specific dialkylaminocarboxylic acid salts as redox agents.

Previously it has been known that free radical polymerization may be carried out at reduced temperatures by employing free radical initiators which function at lower temperatures. Further, it has been recognized that certain free radical intiating catalysts, such as various organic peroxides could be employed in conjunction with specified redox systems to produce polymerization at reduced temperatures. Such a procedure is utilized in the production of "cold" rubber. It has also previously been known and described in U.S. Patent 2,464,062, that organic peroxydicarbonates such as diisopropyl peroxydicarbonate would initiate polymerization of unsaturated material such as styrene at 25° C. Benzoyl peroxide and related compounds used without activators generally require temperatures on the order of 50° C. to 80° C.

Polymerization at lower temperatures is desirable for a variety of reasons. For example, at lower temperatures more facile temperature control, faster polymerization, reduced discoloration, higher molecular weight, etc. may be obtained. Further, in the preparations of copolymers of substances such as butadiene and isoprene which contain a second double bond, polymerization at the usual high temperatures leads to cross-linking and branch-chain formation.

Now it has been discovered that polymerization of olefinic substances, notably ethylenically unsaturated polymerizable monomers such as ethylene and derivatives of ethylene which are monosubstituted or unsymmetrically disubstituted, viz., styrene, may be effectively polymerized at temperatures at low as 5° C., and even lower, by conducting the polymerization in the presence of an organic redox system with a catalyst which is an organic peroxydicarbonate, for example, diisopropyl peroxydicarbonate. As a result of this discovery polymerization yields are easily obtainable which previously could only be obtained at elevated temperatures and with high catalyst concentration.

By utilization of this discovery uniform polymers may be obtained. Frequently by low temperature polymerization higher-melting polymers may be obtained from a monomer than are obtainable by higher temperature polymerization and often these higher-melting polymers are more stable and less readily decomposed by thermal means. Further, copolymers and homopolymers involving monomers like butadiene, isoprene and chloropene, may be obtained by low-temperature polymerization with little or no crosslinking resulting from polymerization of the second double bond. This makes possible the preparation of fusible polymers containing olefinic unsaturation which may be utilized in subsequent crosslinking. Many other advantages may also be realized by the practice hereof, as will be apparent hereinafter.

In accordance herewith, polymerization of ethylenically unsaturated polymerizable compounds, notably ethylene, monosubstituted ethylenes, and unsymmetrically disubstituted ethylenes, is induced by proper use of small quantities of organic peroxydicarbonate, notably diisopropyl peroxydicarbonate. Thus, a combination of peroxydicarbonate ester and dialkylaminoaromatic substituted carboxylic acid salt is used in the liquid phase polymerization of ethylenically unsaturated monomers, ideally in heterogeneous aqueous polymerization medium. A solution of peroxydicarbonate in liquid monomer is agitated with an aqueous solution to distribute the organic liquid in an aqueous medium containing an emulsifying agent and a water-soluble alkali or alkaline earth metal salt of dialkylaminoaromatic substituted carboxylic acid redox agent, whereby to effect polymerization of the ethylenically unsaturated monomer at reduced temperature in an emulsion or dispersion.

The unsaturated materials which may be polymerized by the practice of this invention are ethylenically unsaturated compounds, more specifically ethylene and monosubstituted and unsymmetrically disubstituted ethylenes containing up to 20 carbon atoms. These compounds include esters, nitriles, and organic halogen compounds, which are olefinically unsaturated compounds of both aromatic and aliphatic types. Heterocyclic compounds such as vinylpyridine and vinylpyrrolidone containing as many as 18 carbon atoms in the acid moiety, may be polymerized in accordance herewith.

Other vinyl derivatives such as vinyl chloride, vinyl fluoride, styrene, nuclear substituted styrenes including o-methyl, m-methyl, p-methyl styrene, divinylbenzene, and other related compounds may also be polymerized in accordance herewith. Vinylidine derivatives, viz., vinylidine chloride and 1,1-dicyanoethylene are also polymerized in accordance herewith.

The acrylates respond particularly well to the techniques disclosed herein and the invention extends to include acrylates and methacrylates containing up to 16 carbon atoms in the alcohol moiety. By way of illustration, methyl methacrylate, ethyl acrylate, propyl acrylate, butyl acrylate, isobutyl acrylate, dodecyl acrylate, dodecyl methacrylate and other related compounds respond to treatment set forth herein.

Other materials susceptible to the practice hereof include: acrylonitrile, methacrylonitrile, certain allyl esters, viz., the bisallyl biscarbonate ester of diethylene glycol, etc. and many related compounds and certain propylene derivatives, such as isopropylene bromide, chloride, and acetate.

Copolymers of the aforementioned ethylenically unsaturated materials may be obtained. The more important copolymers which may be prepared pursuant to this invention include copolymers of butadiene, acrylonitrile, isoprene, vinyl acetate, vinylidene chloride, methyl acrylate, and divinylbenzene with styrene, chloroprene, and one another. Copolymers of butadiene with styrene, butadiene with acrylonitrile, butadiene with chloroprene, isoprene with styrene, vinyl acetate with vinylidene chloride, chloroprene with acrylonitrile, styrene with methyl acrylate, and styrene with divinylbenzene, are examples of specific copolymers which may be prepared pursuant to this invention. Terpolymers prepared in accordance herewith are often of special utility, such as those derived from butadiene, acrylonitrile, styrene mixtures and other mixtures wherein vinyl acetate, isoprene, or methyl methacrylate may be components of the terpolymer.

Useful emulsifying agents may be nonionic, cationic, or anionic, as well as mixtures thereof. Mixtures of emulsifying agents often produce enhanced results. It is preferred to use a mixture of nonionic emulsifying agent with anionic emulsifying agent. Examples of suitable emulsifying agents which may be employed herein include the following, but it is not intended to exclude many similar emulsifying agents which are not disclosed herein, as well as mixtures of emulsifying agents:

*Anionic.*—Sodium lauryl sulfate (Duponol ME), sodium alkylnapthalenesulfonate (Nekal BX–78), sodium salt of sulfated alkylphenoxypolyoxyethylene (Alipal Co–433), complex organic phosphte (Gafac RE–610).

*Nonionic.* — Nonylphenoxypoly(ethylenoxy)ethanols (Igepal Co–630 and Co–880), polyoxyethylated fatty alcohol (Emulphor ON–870).

*Amphoteric.* — Hydroxylated phosphatides of soybean oil complex (Hydroxy Lecithin).

Organic peroxydicarbonates useful in this invention have the general structure:

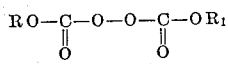

where R and $R_1$ are organic radicals derived from alcohols and which are attached to the oxygen atoms by a carbon atom. The dialkyl peroxydicarbonate esters (i.e., those in which R and $R_1$ are alkyl groups), are particularly effective. These compounds form free radicals useful for the initiation of polymerization at temperatures generally lower than other classes of peroxy compounds, such as benzoyl peroxide and lauroyl peroxide. In accordance herewith peroxydicarbonate compounds initiate free radical polymerization at still lower temperatures when employed in the cooperative presence of redox salt compounds disclosed herein. Among the organic peroxydicarbonates suitable for use herein are the peroxydicarbonates of monohydric alcohol, containing less than about 18 carbon atoms. Especially suitable for use for catalyzing polymerization in conjunction with redox agents at lower temperatures are the alkyl peroxydicarbonates derived from alcohols containing up to about 18 carbon atoms such as the methyl, ethyl, isopropyl, n-propyl, isobutyl, n-butyl, lauryl, amyl, and hexyl peroxydicarbonates, and the corresponding aliphatic unsaturated peroxydicarbonates, such as the allyl, methallyl, crotyl, vinyl, propargyl, or 2-chloroallyl peroxydicarbonates. Araliphatic, heterocyclic, aromatic and cycloaliphatic derivatives, such as benzyl, cyclohexyl, tetrahrydrofurfuryl or cinnamyl peroxydicarbonate also may be used according to this invention. Moreover, more complex peroxydicarbonates such as bis-(2-nitro-2-methylpropyl) peroxydicarbonate and the products derived by reaction of the chloroformates of monohydroxy acids or their esters (ethyl lactate, ethyl glycollate, ethyl salicylate, methyl lactate, etc.) with sodium peroxide, may be used as herein contemplated. Also contemplated are the poylmeric peroxydicarbonates obtained by reacting ethylene glycol dichloroformate or diethylene glycol dichloroformate or dichloroformate of other glycol or polyglycol with sodium peroxide and such other peroxydicarbonates as may be described or suggested in U.S. Patent 2,370,588.

The peroxydicarbonate esters are usually water-insoluble liquids but sometimes are white crystalline solids. They are usually soluble in the polymerizable monomers at or below the temperature of polymerization. The percarbonate esters, and particularly the liquid esters, slowly decompose at normal room temperatures and may at slightly higher temperatures decompose spontaneously. Since the decomposition reaction is exothermic, the heat generated by slow decomposition at normal room temperature may cause an elevation of the temperature within the mass and induce a rapid decomposition. Accordingly, the percarbonates should be refrigerated or otherwise stabilized prior to used. The stabilization may be effected by cooling to 0° C. or lower by suitable cooling medium, for example, solid carbon dioxide. The stabilization may be effected also by dissolving up to one percent of iodine in the liquid percarbonate and washing the iodine out just prior to use.

Preferred redox agents as employed herein are the water-soluble alkali metal and alkaline earth metal carboxylates resulting from the neutralization of selected carboxylic acids with alkali metal hydroxide, or alkaline earth metal hydroxide. Any water-soluble salt of the selected carboxylic acid may be employed, even those resulting from substitution of oxides and hydroxides of metals from groups of the Periodic Table other than I and II. While effective for polymerization, such salts sometimes introduce other considerations, for example, manganese 4-dimethylamino-benzoate may lead to discolored products of polymerization. Obviously, when discoloration is undesirable a different salt is used. Therefore, the alkali and alkaline earth metal salts and especially sodium salts, are more widely useful and hence preferred. Alkali metal hydroxides which may be employed for neutralizing the carboxylic acids include: lithium hydroxide, sodium hydroxide, potassium hydroxide, rubidium hydroxide, cesium hydroxide. The sodium and potassium compounds are economically preferable. Alkaline earth metal hydroxides include: barium hydroxide, calcium hydroxide, strontium hydroxide, magnesium hydroxide, and beryllium hydroxide. However, of these the alkaline earth metal hydroxides of magnesium, calcium, strontium, and barium are especially attractive economically. Obviously, hydroxides of divalent metals such as alkaline earth metals, lead to the formation of a diacid salt. The redox agents employed herein may be prepared by well-known procedures. Such a procedure may be utilized in the preparation of 4-dimethylamino-cinnamic acid and is typified by the method of Dutt, J. Indian Chem. Soc., Volume 1, pages 298 to 300. Likewise, 4-dimethylaminobenzoic acid may be prepared by method of Misenheimer u. Budkewicz Ann., Volume 423, page 89. Saturated aromatic substituted acids may be prepared by known reduction procedures from corresponding unsaturated acids. The carboxylic acids suitable for use in the preparation of the redox compounds generally contain fewer than 30 carbon atoms but may also contain more and are the dialkylaminoaromatic derivatives of the carboxylic acids represented by the following formula:

$$R'R''N-X-(CH_2)_r-(CH=CH)_s-COOH$$

Wherein: $s$ may have the valves zero and unity, and $r$ may be a small whole number, including 0 through 10, when $s$ equals zero; and $r$ may be a small whole number from 0 through 4, when $s$ is unity; both $r$ and $s$ may be zero simultaneously; R' and R" may be selected from aliphatic groups containing up to 18 carbon atoms and typified by the groups: methyl, ethyl, propyl, isopropyl, butyl, isobutyl, t-butyl, secondary-butyl, hexyl, octyl, and may be the same or different.

X may be selected from the following groups:

o, m, p-phenylene, substituted o, m, p-phenylene

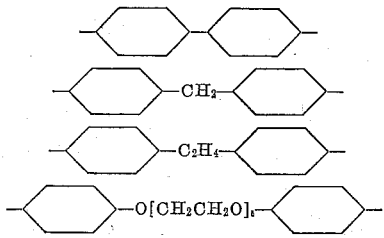

$t = 0$, 1 and 2

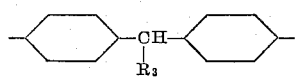

$R_3 = CH_3, C_2H_5, C_3H_7, C_4H_9, C_6H_{11}, C_6H_5$

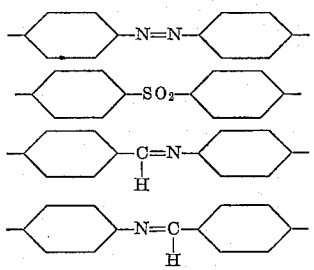

Alkali metal salts and alkaline earth metal salts of the aforementioned carboxylic acids are prepared by reacting the acid with a solution obtained by dissolving the corresponding alkali metal hydroxide and alkaline earth metal hydroxide in water and agitating the resulting solution with a molecular equivalent of the desired carboxylic acid, employing sufficient water to result in a concentration of the soluble salt of from about 1 percent by weight of solution to saturation. The salt may then be isolated for utilization by redissolving in water to form an aqueous solution suitable for use in an emulsion polymerization. Alternatively, the salt solution may be employed directly in the emulsion polymerization without prior isolation.

In the practice of this invention a dialkylaminocarboxylic salt, viz., sodium 3-dimethylaminobenzoate is dissolved in water containing emulsifying agent, such as nonylphenoxypoly(ethylenoxy)ethanol (Igepal Co-630). This aqueous solution is cooled to 5° C. or other suitable temperature and is combined with an ethylenically unsaturated material suitable such as described hereinbefore, and typified by styrene, to which compound was previously added a small quantity, for example, 0.5 part per hundred parts of monomer by weight of dialkyl peroxydicarbonate typically isopropyl peroxydicarbonate. After agitation at 5° C. for a period of time, suitably for 4 hours, the polymerized emulsion resulting may be separated to recover polymer and unconverted monomer. The separation of polymerized emulsion may be accomplished by dilution with a solvent to cause separation of organic phase and aqueous phase. A suitable solvent for this purpose is benzene. Alternatively, emulsion of polymer and aqueous phase may sometimes be separated by adding thereto a small quantity of methanol.

The temperature used in the practice hereof may be any temperature from −35° C. to 100° C., although the vapor pressure of certain monomers would require that the reaction be carried out under pressure sufficient to maintain the monomer as a liquid at the chosen temperature. However, temperatures below approximately 0° C. require special apparatus for cooling and precautions against ice formation on the cooling coils must be taken. Hence, a nonparticipating water-soluble organic solvent, such as acetone or methanol, or an inert salt like sodium chloride, is added when it is desired to conduct polymerization at temperatures below 0° C. At temperatures approaching the normal boiling point of the liquid medium, the reaction may become uncontrollably rapid when, by way of illustration, the emulsion polymerization herein disclosed is applied to styrene. The medium has a boiling point near 100° C. and utilization of such a high temperature with the herein disclosed redox-catalyst systems would result in a polymerization of nearly explosive intensity. However, when it is desired to employ high temperatures in the utilization of these redox-catalyst systems, the polymerization may be conducted at a controllable rate by reducing the concentration of the redox agent. Temperatures such as those above 35° C. in general have a tendency to produce polymers lacking the improved properties obtained by polymerization at lower temperatures, such as 5° C. Thus, while the redox-catalyst systems disclosed herein function at temperatures from −35° C. to 95° C., benefits are greatest with temperatures from approximately −20° C. to approximately 30° C.

The concentration of the various components utilized in the practice hereof may be varied over extremely wide ranges. The amount of aqueous phase employed may vary from a few percent by weight of the monomer phase to many times the weight of the monomer phase. However, the relationship of aqueous phase to organic phase is dependent upon the type of emulsion desired and the particular monomer which is being polymerized. Generally, from 50 parts of water per 100 parts by weight of monomer to 1,000 parts of water per 100 parts by weight of monomer is preferred. When it is desired to polymerize styrene, employing the techniques herein described, a suitable ratio is 220 parts of water per 100 parts of monomer by weight. Increasing the quantity of water greatly requires an increase in the quantity of redox agent employed, whereas a decrease in the quantity of water often results in too rapid polymerization.

In preparation for polymerization, the selected peroxydicarbonate is dissolved in the monomer by stirring. The amount of peroxydicarbonate employed depends on the particular peroxydicarbonate selected. Generally, adequate initiation of polymerization may be obtained by dissolving 0.001 mole of peroxydicarbonate in the monomer per mole of monomer. For a monomer of molecular weight of about 100 and diisopropyl peroxydicarbonate this represents 0.2 weight percent of the monomer. When the particular peroxydicarbonate is diisopropyl peroxydicarbonate polymerization may be initiated by employing as little as 0.02 percent or even less of diisopropyl peroxydicarbonate by weight of monomer. Utilization of more than 2.0 percent of diisopropyl peroxydicarbonate by weight of styrene often results in an uncontrollably rapid polymerization at 5° C. Thus, it is preferred to employ from 0.02 to 2.0 percent diisopropyl peroxydicarbonate by weight of monomer. Many monomers are polymerized at preferred rate by the utilization of 0.5 percent diisopropyl peroxydicarbonate by weight of monomer.

The weight ratio of redox agent to peroxydicarbonate depends upon the particular redox agent and particular peroxydicarbonate selected as well as upon the olefin and amount of aqueous phase. Thus, when polymerizing styrene with diisopropyl peroxydicarbonate, a preferred amount of sodium 4-dimethylaminocinnamate is approximately 1.1 grams in 220 grams of water per 100 grams of styrene monomer containing 0.47 gram of diisopropyl peroxydicarbonate. Thus, approximately 2 parts by weight of redox compound is preferred per part of peroxydicarbonate. In general, more than one part by weight of redox compound per part of peroxydicarbonate, but less than 250 parts by weight of redox compound per part of peroxydicarbonate is required. Ratios of redox compound to peroxydicarbonate outside of this range generally give rates of reaction which are too slow at the low ratio and which are too fast at the high ratio. Preferred ratios are generally within the range of 0.5 part by weight of redox compound per part peroxydicarbonate to 10 parts by weight of redox compound per part peroxydicarbonate.

The amount of redox agent required is approximately proportional to the amount of peroxydicarbonate employed and may also vary within wide limits. When 220 parts of water per 100 parts of monomer are employed, the amount of redox agent may be selected from 0.05 part of redox agent per 100 parts of monomer by weight to as much as 5.0 parts of redox agent per 100 parts of monomer by weight. In the polymerization of styrene good results may be obtained by employing from 0.5 to 1.0 part of redox agent per 100 parts of monomer by weight.

The amount of emulsifier is selected in accordance with the heterogeneous condition of the emulsion obtained under reaction conditions. It is generally desirable to produce an emulsion of small visible droplets of the monomer in the continuous aqueous phase so that the solid polymer at completion of the conversion has the consistency of sand, or in other cases so that a cream results. Creams generally require greater quantities of emulsifying agent than do emulsifications containing larger droplets. When 220 parts of water are employed per 100 parts by weight of monomer, satisfactory amounts of emulsifier typically are in the range of 2 to 20 parts of emulsifier, ionic or nonionic, per 100 parts of monomer by weight. Further, either anionic or cationic emulsifying agents may be employed. Generally, best results are obtained by employing a mixture of anionic emulsifier with nonionic emulsifier. However, the rate of polymerization and yield of polymer is dependent to some degree upon the type of emulsifying agent employed. Nonionic emulsifying agents and mixtures of nonionic emulsifying agents with anionic emulsifying agents generally produce the highest yields per unit of emulsifying agent.

As in other polymerizations, the presence of air or oxidizing atmosphere has an adverse influence on the yield of polymer and the properties of the polymer, such as molecular weight. Thus, it is preferred to carry out polymerization in accordance herewith by also excluding air from the reaction system. This may be accomplished most readily by displacing air from the apparatus used in carrying out the polymerization by an atmosphere of nitrogen.

Substances foreign to the polymerization are generally not desirable in either the olefin medium or the aqueous medium. However, many substances may be present without harmful effect, viz., certain salts may be added to alter the density of the aqueous layer to facilitate subsequent separation of layers providing they are otherwise inert.

The invention described herein may be better understood by reference to the following examples. It is not intended, however, that the invention be construed as limited thereby.

EXAMPLE I

Deaerated water, along with the selected salt of dialkylaminocarboxylic acid, was placed in a 500-cubic centimeter polymerization pressure bottle equipped with means for flushing with nitrogen. A tube was fitted to the bottle for the introduction of other ingredients and withdrawal of samples. The bottle was flushed with nitrogen gas and monomer and emulsifying agent were added. The bottle and contents were agitated by tumbling at 30 revolutions per minute in a water bath for one hour at 5° C. to obtain temperature equilibrium. At this point peroxydicarbonate was injected and tumbling was resumed while polymerization occurred. At suitable periods, usually one or two hours, samples were withdrawn for determining the weight percent solids in the emulsion by obtaining the nonvolatile content at 105° C. The nonvolatile content of the sample is taken as a measure of the polymerization yield.

Following this general procedure at 5° C., 100 parts by weight of styrene, 220 parts by weight of water, 0.47 part by weight of diisopropyl peroxydicarbonate, 0.55 part by weight of sodium hydroxide, and 10.0 parts by weight of nonylphenoxypoly(ethyleneoxy)ethanol were combined with a dialkylaminocarboxylic acid salt with the following results:

TABLE I

| Sodium Dialkylaminocarboxylate | Weight Percent of Styrene | Weight Percent Yield [1] of Polymer | |
|---|---|---|---|
| | | At 120 min. | Terminal [2] |
| Nil | | 1 | ca. 80 |
| Sodium 3-dimethylamino-benzoate | 0.92 | 30 | 73 |
| Sodium 4-dimethylamino-benzoate | 0.92 | 30 | 70 |
| Sodium 4-dimethylamino-cinnamate | 1.07 | 52 | 56 |

[1] Percent yield by weight of polymer based on monomer charged by measurement of nonvolatile material.
[2] Weight percent yield of polymer at exhaustion of peroxydicarbonate determined by iodiometric titration. Usually at 5 hours.

EXAMPLE II

Employing the procedure of Example I, 0.92 part by weight of sodium 3-dimethylaminobenzoate per 100 parts by weight of styrene and 5.0 parts by weight of sodium lauryl sulfate were utilized in a comparison of the yield of polymer obtainable with diisopropyl peroxydicarbonate with the yield of polymer obtainable by using benzoyl peroxide as shown in Table II.

TABLE II

| Peroxide | Percent by Weight of Monomer | Polymer, Wt. Percent Yield [1] | |
|---|---|---|---|
| | | 120 min. | Terminal [2] |
| Diisopropyl peroxydicarbonate | 0.47 | 23 | 43 |
| Benzoyl peroxide | 0.59 | 10 | 52 |

[1] Percent yield by weight of polymer based on monomer charged by measurement of nonvolatile material.
[2] Weight percent yield of polymer at exhaustion of peroxydicarbonate determined by iodiometric titration. Usually at 5 hours.

EXAMPLE III

In lieu of sodium 3-dimethylaminobenzoate in Table I, potassium 3-dimethylaminobenzoate is substituted to result in approximately 75 percent by weight yield of polymer when the diisopropyl peroxydicarbonate is completely consumed. Similarly, calcium 4-dimethylaminocinnamate is substituted for sodium 4-dimethylaminocinnamate in Table I to result in approximately a 50 weight percent terminal yield of polymer.

EXAMPLE IV

Following the procedure of Example I, styrene was polymerized at 5° C. As in Example I, 100 parts by weight of styrene, 220 parts by weight of water, 0.47 part by weight of diisopropyl peroxydicarbonate, 0.92 part by weight of sodium 3-dimethylaminobenzoate and various amounts of emulsifying agent, with and without added sodium hydroxide, were combined as previously described to result in emulsified polystyrene as shown in Table III.

TABLE III

| Emulsifier | Nature | Percent by wt. of Styrene | NaOH, wt. Percent of Styrene | Weight Percent Polymer Yield [1] | |
|---|---|---|---|---|---|
| | | | | At 120 min. | Terminal [2] |
| Sodium lauryl sulfate | Anionic | 5 | 0.55 | | 43 |
| Do | do | 10 | 0.55 | [3] 60 | 60 |
| Do | do | 10 | nil | 23 | 36 |
| Alkyl naphthyl sulfonate | do | 5 | 0.55 | 14 | 30 |
| Do | do | 5 | nil | 5 | 10 |
| Organic phosphate ester | do | 5 | nil | 24 | 33 |
| Nonylphenoxypoly(ethyleneoxy)ethanol.[4] | Nonionic | 5 | nil | 10 | 45 |
| Do | do | 10 | nil | 30 | 73 |
| Do | do | 10 | 0.55 | [3] 30 | 70 |
| Polyoxyethylated fatty alcohol | do | 5 | nil | 35 | 48 |
| Do | do | 10 | nil | 57 | 62 |
| 3 parts by wt. sodium lauryl sulfate; 2 parts by wt. nonylphenoxypoly(ethyleneoxy)ethanol. | Mixed | 5.5 | 0.55 | 50 | 52 |

[1] Percent yield by weight of polymer based on monomer charged by measurement of nonvolatile material.
[2] Weight percent yield of polymer at exhaustion of peroxydicarbonate determined by iodiometric titration. Usually 2 to 6 hours.
[3] Sodium hydroxide increased the yield of polymer obtained in the presence of anionic emulsifier, but does not increase the yield of polymer obtained in the presence of nonionic emulsifier.
[4] Length of the poly(ethyleneoxy) chain from 8 to 30 units.

EXAMPLE V

Following the procedure of Example I, several monomers were polymerized to obtain products as shown in Table IV. The components were combined as indicated in Example I to provide 220 parts by weight of water, 100 parts by weight of total monomer; 0.47 part by weight diisopropyl peroxydicarbonate; 0.92 part by weight sodium 3-dimethylaminobenzoate; and an emulsifying agent. One emulsifying agent employed contained 0.55 part by weight of sodium hydroxide; 3.3 parts by weight of sodium lauryl sulfate, and 2.2 parts by weight of nonylphenoxypoly(ethyleneoxy)ethanol per 100 parts of monomer and is indicated in Table IV as emulsifier A. A second emulsifying agent employed in the polymerization of some of the various monomers was nonylphenoxypoly(ethyleneoxy)ethanol, 10.0 parts of monomer shown as emulsfier B in Table IV. The third emulsifying agent was 10 parts by weight per 100 parts by weight of monomer of sodium lauryl sulfate and is indicated as emulsifier C in Table IV.

TABLE IV

| Wt. Percent Composition Monomer Mixture | Emulsifier | Polymer Percent Yield [1] | | Wt. Percent Composition Monomers | | | |
|---|---|---|---|---|---|---|---|
| | | 120 min. | Term.[2] | I | II | III | IV |
| I Vinylidene chloride, 100 | A | 65 | 69 | 100 | | | |
| I Styrene, 50; II Acrylonitrile, 50 | A | 63 | 68 | 68 | 32 | | |
| I Styrene, 50; II Acrylonitrile, 40; III Butadiene, 10 | A | 20 | 66 | 50 | 30 | 20 | |
| I Styrene, 40; II Acrylonitrile, 30; III Butadiene, 30 | A | 35 | 58 | 33 | 27 | 40 | |
| I Styrene, 40; II Vinylidene chloride, 60 | A | | 38 | 69 | 31 | | |
| I Styrene, 50; II Acrylonitrile, 40; III Chloroprene, 10 | A | | 50 | 66 | 21 | 13 | |
| I Styrene, 30; II Acrylonitrile, 30; III Vinylidene chloride, 30; IV Butadiene, 10 | A | | 17 | 40 | 25 | 12 | 23 |
| I Styrene, 37.5; II Acrylonitrile, 37.5; III Vinylidene chloride, 25 | A | | 70 | 50 | 27 | 23 | |
| I Methyl methacrylate, 100 | B | | ca. 100 | 100 | | | |
| I Styrene, 50; II Methyl methacrylate, 50 | B[3] | | 41 | 52 | 48 | | |
| I Vinyl chloride, 100 | B | | 20 | 100 | | | |
| I Acrylonitrile, 100 | B | | 29 | 100 | | | |
| I Butadiene, 50; II Styrene, 50 | C | 3 | 13 | 75 | 25 | | |

[1] Percent yield by weight of polymer based on monomer charged by measurement of nonvolatile material.
[2] Weight percent yield of polymer at exhaustion of peroxydicarbonate determined by iodiometric titration. Usually 5 hours.
[3] Emulsifying agent used 5 percent by weight

EXAMPLE VI

Following the procedure of Example I, 220 parts by weight of water, 100 parts by weight of styrene, emulsifying agent as indicated in Example V, emulsifier A or emulsifier B, were combined for the polymerization of monomer with diisopropyl peroxydicarbonate and sodium 3-dimethylaminobenzoate as shown in Table V.

TABLE V

| Percent IPP [1] | Sodium 3-dimethyl-aminobenzoate, Percent by Weight | Emulsifier System | Polymer, wt. percent Yield [2] | |
|---|---|---|---|---|
| | | | 120 min. | Terminal [3] |
| 0.47 | 0.92 | A | 50 | 52 |
| 0.47 | 0.46 | A | 43 | 55 |
| 0.47 | 0.92 | B | 30 | 70 |
| 0.24 | 0.92 | B | 28 | 67 |
| 0.12 | 0.92 | B | 13 | 57 |

[1] Diisopropyl peroxydicarbonate, percent by weight of styrene.
[2] Percent yield by weight of polymer based on monomer charged by measurement of nonvolatile material.
[3] Weight percent yield of polymer at exhaustion of peroxydicarbonate determined by iodometric titration. Usually at 5 hours.

In lieu of diisopropyl peroxydicarbonate, other peroxydicarbonates are employed with satisfactory results. Thus, peroxydicarbonates including methyl isopropyl peroxydicarbonate, ethyl isopropyl peroxydicarbonate, isopropyl n-butyl peroxydicarbonate, bis(2-nitro-2-methylpropyl) peroxydicarbonate, bis-(2-carbamyloxyethyl) peroxydicarbonate, dibenzyl peroxydicarbonate, and bis-(2-chloroethyl) peroxydicarbonate, may be substituted on an equivalent mole basis for diisopropyl peroxydicarbonate in Example I with effective results.

Although the invention has been described heretofore, primarily with reference to a preferred embodiment which utilizes heterogeneous media for polymerization, it is also applicable to polymerizations conducted in other media. For example, it may be practiced in homogeneous media such as may be provided by dissolving the monomer and dialkyl peroxydicarbonate in a solvent to which a solution miscible therewith of the selected redox agent is added. A suitable solvent for the monomer may be selected from saturated esters such as ethyl acetate. Sodium 4-dimethylaminophenyl acetate dissolved in the dimethyl ether of ethylene glycol provides an excellent redox solution which is miscible with the monomer solution. The mixture of solutions is then agitated at a constant temperature, such as 0° C. until a test sample shows complete consumption of peroxydicarbonate catalyst, following which the resulting polymer may be isolated by a known procedure. Because of the difficulty of selecting inert solvent systems in which all components of the reaction are soluble, it is preferred that the invention be practiced in heterogeneous medium.

There have been set forth hereinbefore the various redox compounds which are useful in practicing the invention. Many compounds having the proper elements of structure may be selected without departing from the spirit of the invention. It is not intended that the invention be limited to the previously disclosed types of compounds since one skilled in the art can readily conceive of variations which contain dialkylamino groups and carboxylic acid groups which are not specifically set forth hereinbefore. Without intending to limit the scope of such compounds the following specific examples of compounds which may be utilized are recited:

Sodium 4-dimethylaminobenzoate
Sodium 3-dimethylaminobenzoate
Calcium 3-dimethylaminobenzoate
Barium 3-dimethylaminobenzoate
Potassium 2-dimethylaminobenzoate
Potassium 3-dimethylaminobenzoate
Sodium 4-diethylaminobenzoate
Sodium 4-dipropylaminobenzoate
Sodium 4-dibutylaminobenzoate
Potassium 3-methylisobutylaminobenzoate
Potassium 4-dilaurylaminobenzoate
Potassium 4-methyloctadecylaminobenzoate
Potassium 2-methyl-4-dimethylaminobenzoate
Potassium 3-chloro-5-dimethylaminobenzoate
Sodium 2,6-dichloro-4-dimethylaminobenzoate
Sodium 2-methoxy-4-dipropylaminobenzoate
Sodium 8-diethylamino-1-naphthoate
Sodium 4'-dimethylamino-4-biphenylcarboxylate
Sodium 2'-dimethylamino-4-biphenylcarboxylate
Sodium 4'-diethylamino-4-biphenylcarboxylate
Sodium 3'-diethylamino-4-biphenylcarboxylate
Sodium 4'-diisopropylamino-4-biphenylcarboxylate
Sodium 4'-dibutylamino-4-biphenylcarboxylate
Sodium 4'-dilaurylamino-4-biphenylcarboxylate
Sodium 4'-dimethylamino-2-biphenylcarboxylate
Potassium 4'-dimethylamino-4-biphenylacetate
Potassium 4'-dimethylamino-4-biphenyl-α-butyrate
Potassium 4-dimethylaminocinnamate
Potassium 3-dimethylaminocrotonate
Sodium 4'-dimethylaminoazobenzene-4-carboxylate
Barium 4'-dimethylaminoazobenzene-4-carboxylate
Sodium 4'-dimethylaminophenylsulfone-4-phenylacetate
α-(4-dimethylamino)-α-(4-carboxyphenyl)ethane sodium salt
α-(4'-dimethylamino)-α-(4-carboxyphenyl)propane sodium salt
α-(4'-dimethylamino)-α-(4-carboxyphenyl)toluene sodium salt
Cyclohexyl-(4-dimethylaminophenyl)-(4'-carboxyphenyl)methane sodium salt
α-(4-dimethylaminophenoxy)-β-(4'-carboxyphenoxy)-ethane sodium salt
Sodium 4-dimethylaminobenzylidene aniline-4'-carboxylate
Sodium 4-benzylidenecarboxylate-4'-dimethylamino-aniline
Sodium 4-(4'-diisopropylaminobenzyl)-benzoate
Sodium 4-(4'-diisopropylaminobenzyl)-phenylacetate
Sodium 4-(4'-diisopropylaminobenzyl)-sulfonate
α-(4'-diisopropylaminophenyl)-β-(4-sulfophenyl)ethane sodium salt
Sodium 4-(4'-dimethylaminophenoxy)-phenylacetate
Sodium 4-(4'-dimethylaminophenoxy)-benzoate While the invention has been described with reference to the details of certain specific embodiments, it is not intended that the invention be limited thereto except insofar as may appear in the following claims.

I claim:
1. A method of polymerizing ethylenically unsaturated compounds susceptible to free-radical polymerization, which comprises polymerizing such unsaturated compounds with a catalytic amount of
(a) a peroxydicarbonate ester represented by the formula:

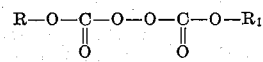

wherein R and $R_1$ are organic radicals of an alcoholic moiety containing up to 18 carbon atoms, and
(b) a salt of a carboxylic acid represented by the formula:

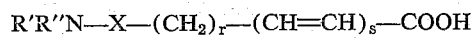

wherein $s$ is 0 or 1, $r$ is a cardinal number of from 0 to 10, R' and R'' are aliphatic radicals containing up to 18 carbon atoms, and X is a divalent aromatic radical;
at temperatures of from —35° C. to 100° C., the weight ratio of said carboxylic acid salt to peroxydicarbonate ester being from 0.5:1 to 250:1.

2. A method according to claim 1 wherein at least two ethylenically unsaturated compounds are polymerized.

3. A method according to claim 1 wherein said peroxydicarbonate ester is diisopropyl peroxydicarbonate.

4. A method according to claim 1 wherein said carboxylic acid salt is an alkali metal dialkylamino benzoate or an alkali metal dialkylamino cinnamate, wherein the alkyl portion of said acid salt contains from 1 to 8 carbon atoms.

5. A method according to claim 1 wherein said carboxylic acid salt is sodium dimethylamino benzoate.

6. A method of polymerizing ethylenically unsaturated compounds susceptible to free-radical polymerization, which comprises bringing to temperatures of from −35° C. to 100° C., a liquid heterogeneous polymerization medium comprising (a) such ethylenically unsaturated compound; (b) a catalytic amount of (1) a peroxydicarbonate ester represented by the formula:

$$R-O-\underset{\underset{O}{\|}}{C}-O-O-\underset{\underset{O}{\|}}{C}-O-R_1$$

wherein R and $R_1$ are organic radicals of an alcoholic moiety containing up to 18 carbon atoms, and (2) a salt of a carboxylic acid represented by the formula:

$$R'R''N-X-(CH_2)_r-(CH=CH)_s-COOH$$

wherein $s$ is 0 to 1, $r$ is a cardinal number of from 0 to 10, $R'$ and $R''$ are aliphatic radicals containing up to 18 carbon atoms, and X is a divalent aromatic radical, the weight ratio of said acid salt to said peroxydicarbonate ester being from 0.5:1 to 250:1; and (c) an emulsifying agent.

7. A method according to claim 6 wherein at least two ethylenically unsaturated compounds are polymerized.

8. A method according to claim 6 wherein said carboxylic acid salt is an alkali metal dialkylamino benzoate or an alkali metal dialkylamino cinnamate, wherein the alkyl portions of said acid salt contains from 1 to 8 carbon atoms.

9. A method according to claim 6 wherein said peroxydicarbonate ester is diisopropyl peroxydicarbonate.

10. A method according to claim 6 wherein said carboxylic acid salt is sodium dimethylamino benzoate.

11. A method of polymerizing styrene, which comprises bringing to a temperature of from −20° C. to 30° C. a liquid heterogeneous polymerization medium comprising styrene, from 0.02 to 2.0 weight percent, based on styrene, of diisopropyl peroxydicarbonate, an aqueous solution of an emulsifying agent, and from 0.05 to 5.0 parts by weight, per 100 parts of styrene, of an alkali metal salt of a dialkylaminoaromatic carboxylic acid selected from the group consisting of dialkylamino benzoic acid, and dialkylamino cinnamic acid, wherein the alkyl portion contains from 1 to 8 carbon atoms.

12. A catalytic composition consisting essentially of (a) a peroxydicarbonate ester represented by the formula:

$$R-O-\underset{\underset{O}{\|}}{C}-O-O-\underset{\underset{O}{\|}}{C}-O-R_1$$

wherein R and $R_1$ are organic radicals of an alcoholic moiety containing up to 18 carbon atoms, and (b) a salt of a carboxylic acid represented by the formula:

$$R'R''N-X-(CH_2)_r-(CH=CH)_s-COOH$$

wherein $s$ is 0 or 1, $r$ is a cardinal number of from 0 to 10, $R'$ and $R''$ are aliphatic radicals containing up to 18 carbon atoms, and X is a divalent aromatic radical, the weight ratio of (b) to (a) being from 0.5:1 to 250:1.

13. A composition according to claim 12 wherein said peroxydicarbonate ester is diisopropyl peroxydicarbonate.

14. A composition according to claim 12 wherein said carboxylic acid salt is sodium dimethylamino benzoate.

15. A composition according to claim 12 wherein said carboxylic acid salt is an alkali metal dialkylamino benzoate or an alkali metal dialkylamino cinnamate, wherein the alkyl portion of said acid salt contains from 1 to 8 carbon atoms.

16. A composition according to claim 12 wherein said divalent aromatic radical, as represented by the letter X in said carboxylic acid formula, is selected from the group consisting of:

(a) o,m,p-phenylene,
(b) substituted o,m,p-phenylene, (c) ⬡—⬡

(d) —⬡—CH₂—⬡—

(e) —⬡—C₂H₄—⬡—

(f) —⬡—O[CH₂CH₂O]ₜ—⬡— wherein $t$ is a cardinal number of from 0 to 2, (g) —⬡—CH(R₃)—⬡— wherein $R_3$ is selected from the group consisting of $CH_3$, $C_2H_5$, $C_3H_7$, $C_4H_9$, $C_6H_{11}$, and $C_6H_5$, (h) —⬡—N=N—⬡—

(i) —⬡—SO₂—⬡—

(j) —⬡—C(H)=N—⬡— and (k) —⬡—N=C(H)—⬡—

17. In a process of polymerizing ethylenically unsaturated compounds susceptible to free-radical polymerization at temperatures of from −35° C. to 100° C. with catalytic amounts of an organic peroxydicarbonate ester containing up to 18 carbon atoms in each of the terminal ester groups, the improvement which comprises employing a reducing amount of a salt of a carboxylic acid represented by the formula:

$$R'R''N-X-(CH_2)_r-(CH=CH)_s-COOH$$

wherein $s$ is 0 or 1, $r$ is a cardinal number of from 0 to 10, $R'$ and $R''$ are aliphatic radicals containing up to 18 carbon atoms, and X is a divalent aromatic radical.

18. A process according to claim 17 wherein said peroxydicarbonate ester is diisopropyl peroxydicarbonate.

19. A process according to claim 17 wherein said carboxylic acid salt is sodium dimethylamino benzoate.

References Cited by the Examiner

UNITED STATES PATENTS

| | | | |
|---|---|---|---|
| 2,464,062 | 3/1949 | Strain. | |
| 2,629,709 | 2/1953 | Uraneck et al. | 260—80 |
| 2,763,635 | 9/1956 | Tucker et al. | 260—93.5 |
| 2,787,604 | 4/1957 | Miller | 260—93.5 |
| 2,833,753 | 5/1958 | Lal | 252—426 |
| 2,839,519 | 6/1958 | Seed | 252—426 |
| 3,186,975 | 6/1965 | Harris | 260—84.7 |
| 3,254,033 | 5/1966 | Welch | 252—426 |

JOSEPH L. SCHOFER, *Primary Examiner.*

JAMES A. SEIDLECK, *Assistant Examiner.*